United States Patent [19]

Iltis et al.

[11] Patent Number: 4,999,176

[45] Date of Patent: Mar. 12, 1991

[54] PREPARATION OF RARE EARTH BORIDES

[75] Inventors: Alain Iltis, Aubervilliers; Patrick Maestro, Fosses, both of France

[73] Assignee: Rhone-Poulenc Chimie, Courbevoie, France

[21] Appl. No.: 341,809

[22] Filed: Apr. 24, 1989

[30] Foreign Application Priority Data

Apr. 22, 1988 [FR] France .................................. 88 05332

[51] Int. Cl.$^5$ ........................ C01B 35/02; C01F 17/00
[52] U.S. Cl. ..................................... 423/289; 423/263
[58] Field of Search ......................... 423/263, 276, 289

[56] References Cited

U.S. PATENT DOCUMENTS

| 3,258,316 | 6/1966 | Tepper et al. | 23/343 |
| 3,784,677 | 1/1974 | Versteeg et al. | 423/252 |
| 3,979,500 | 9/1976 | Sheppard et al. | 423/289 |
| 4,260,525 | 4/1981 | Olsen et al. | 252/521 |

FOREIGN PATENT DOCUMENTS 2623790  6/1989  France .
6804216  9/1969  Netherlands .

OTHER PUBLICATIONS

Progress, *Progress in Boron Chemistry*, H. Steinberg et al., New York, 1970, VII, p. 299.

Chemical Abstracts, vol. 93, No. 22, Dec. 1980, p. 141, No. 206964w, Columbus, Ohio, US, "Study of Conditions for the Production of Technical-Grade Samarium, Europium and Gadolinium Hexaborides under Pilot Plant Conditions".

"Production of Chromium Borides", Kartvelishvili et al, Chemical Abstracts, vol. 91, No. 18, Oct. 29, 1979, p. 255, No. 144907c, Columbus, Ohio.

*Primary Examiner*—Gary P. Straub
*Assistant Examiner*—Stephen G. Kalinchak
*Attorney, Agent, or Firm*—Burns, Doane, Swecker & Mathis

[57] ABSTRACT

The rare earth borides are prepared at relatively low temperatures by reacting a rare earth halide with elemental boron in the presence of a reducing amount of aluminum metal.

30 Claims, No Drawings

PREPARATION OF RARE EARTH BORIDES

BACKGROUND OF THE INVENTION

1. Field of the Invention

The present invention relates to the preparation of rare earth borides.

By the expression "rare earth" according to this invention are intended the rare earth elements designated the lanthanides, having atomic numbers ranging from 57 to 71, inclusive, and yttrium, having an atomic number of 39.

2. Description of the Prior Art

The rare earth borides are known compounds having desirable electrical properties In particular, lanthanum hexaboride has excellent properties of thermionic emission and is used as an emissive cathode in high energy electrical devices.

At the present time, the industrial development of the rare earth borides is limited by the difficulty of producing a product of satisfactory purity by a process applicable on an industrial scale.

It is known to this art to prepare lanthanum boride by reducing lanthanum sesquioxide with boron carbide or elemental boron under reduced pressure (G. A. Meerson et al, *Izv. Akad. Nauk. SSR Neorg. Mater,* 3, No. 5, 802–806 (1967)). However, as these reactions are carried out at temperatures higher than 1,500° C., not only is a graphite crucible required, but also a graphite lined furnace.

It has also been proposed, according to U.S. Pat. No. 3,902,973, to prepare rare earth borides by the electrolysis of a source of rare earths in a molten salt medium containing a cryolite and an alkali metal borate. Such a process is relatively complex in view of the electrolysis temperature of from 950° to 1,050° C. and the usual problem of the recovery of the rare earth boride at the cathode arises, with the latter also causing pollution because of the cryolite.

In the process described in U.S. Pat. No. 4,260,525, the same problem of separation of the rare earth boride is encountered. This process entails mixing a rare earth carbonate, nitrate or oxide with boron, in the presence of aluminum, to dissolve the boron at a temperature of from 1,200° to 1,600° C., next heating the reaction medium within this temperature range, cooling it, and then separating the rare earth boride from the aluminum oxide formed.

To eliminate the difficulties of separation and purification of the products produced by the above processes of the prior art, the assignee hereof, in FR 87/16,396, proposed a process for the preparation of a rare earth boride by heating a rare earth chloride together with elemental boron.

The process of this '396 application features directly producing a rare earth boride by heating a rare earth chloride with elemental boron, as the only secondary product formed is boron chloride, which is volatile under the conditions of the reaction.

Another advantage of the process described in FR 87/16,396 is that it can be carried out in conventional apparatus, e.g., in a furnace of alumina or aluminosilicate bricks, as the reaction temperature is relatively low; it may be less than 1,500° C. and preferably around 1,200° C.

As the reactions for the synthesis of the rare earth borides are carried out at a relatively high temperature, need continues to exist in this art for processes which can be conducted at even lower reaction temperature.

SUMMARY OF THE INVENTION

Accordingly, a major object of the present invention is the provision of an improved process for the preparation of rare earth borides, which improved process may typically be carried out at temperatures from 100° to 200° C. less than those heretofore characterizing the state of this art.

Briefly, the present invention features heating a rare earth halide together with aluminum and elemental boron.

DETAILED DESCRIPTION OF THE PREFERRED EMBODIMENTS OF THE INVENTION

More particularly according to the present invention, the rare earth halide starting material is preferably a rare earth chloride or a rare earth fluoride.

Even more preferably, the rare earth chlorides are employed.

A considerable advantage of the process of the invention entails the use of aluminum, which makes it possible to lower the reaction temperature by 100° to 200° C. vis-a-vis the prior art. This is particularly important, since, if a rare earth fluoride is used, and in light of the slow kinetics thereof, the reaction must be carried out at an elevated temperature, preferably higher than the melting temperature of the rare earth fluoride, which most typically ranges from 1,300° to 1,500° C.

Another advantage of the process of the invention is that it presents no problem relative to the purification of the final product rare earth borides as the secondary compounds formed, which are $BX_3$ and $AlX_3$, are volatile compounds under the conditions of the reaction.

Finally, an additional advantage of the process of the invention is that the use of aluminum makes it possible to reduce the amount of boron to be introduced, the latter being the most expensive of the starting material reagents. A comparison of the reaction equilibria (1) and (2) relative to the processes of the invention and that of FR 87/16,396, respectively, evidences this fact (wherein RE = rare earth):

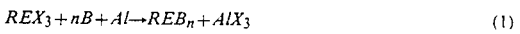

$$REX_3 + nB + Al \rightarrow REB_n + AlX_3 \qquad (1)$$

$$REX_3 + (n+1)B \rightarrow REB_n + BX_3 \qquad (2)$$

In Reactions (1) and (2), X represents the halogen atom, n is the number of boron atoms per rare earth atom and generally is equal to 4 or 6.

It will be appreciated that the use of aluminum is already known to this art, in a process for the preparation of rare earth borides, said process consisting of mixing a rare earth carbonate, nitrate or oxide with boron.

However, the aluminum is not used for the same function, and essentially serves only to dissolve the boron, while according to the invention it is used to reduce the rare earth chloride.

Furthermore, in a later stage of purification by acid attack, the aluminum is necessary to recover the rare earth boride formed.

Finally, in contrast to the invention, this prior art process produces rare earth boride crystals of a microscopic size.

According to the process of the invention, a chloride or a fluoride of a rare earth is used as the starting material. It is also possible to use a mixture of a chloride and/or a fluoride of at least two rare earths.

It is desirable that the halide used be of a high purity, in particular free of oxygen impurities, such as any residual oxide.

Preferably, a rare earth halide having a purity greater than 95% is used.

The rare earth fluorides are available in the anhydrous state, as they are not highly hygroscopic.

Concerning the rare earth chlorides, they may be used both in the anhydrous and the hydrated forms. They may contain a residual amount of oxychloride or water. A total amount of up to 20% by weight may be tolerated.

Preferably, the rare earth chloride is dried at a temperature of from 20° to 200° C., more preferably around 100° C. The drying may be carried out in air and preferably under reduced pressure of, for example, from 1 mm mercury (=133.322 Pa) to 100 mm mercury (13 332.2 Pa).

The duration of the drying process advantageously ranges from 2 to 24 hours.

Either prior to or after such drying operation, it is possible to add ammonium chloride to facilitate the dehydration of the rare earth chloride.

Both amorphous or crystalline elemental boron may be used.

Preferably, a boron devoid of oxygen impurities is used. Metallic impurities are less detrimental. In fact, most of these impurities are eliminated in the form of gaseous metallic halides over the course of the process of the invention. A boron having a purity of 85% or higher may be used, which is commercially available under the designation of "technical" boron.

The aluminum may be used in the metallic state, or in the form of powder, granules, chips, etc.

Preferably, aluminum having a purity greater than 95% and devoid of oxide impurities, is used.

The different proportions of the reagents of the process of the invention are set forth below.

The amount of boron introduced, expressed relative to the amount of the rare earth halide, is preferably at most equal to the stoichiometric reaction amount and, even more preferably, slightly less; it may amount to a deficiency of 10% to 20% of the stoichiometric amount of the reaction. It is a function of the rare earth boride prepared.

The molar ratio of the boron to the rare earth halide is at most equal to 6.5 and preferably ranges from 5.2 to 6.5, in the preparation of a rare earth hexaboride, and a maximum of 4.5, and preferably from 3.6 to 4.5, in the preparation of a rare earth tetraboride.

The amount of aluminum introduced is at the most equal to the reaction stoichiometric amount and preferably is slightly less, e.g., from 10% to 20% less.

The initial stage of the process of the invention entails preparing an intimate admixture of the rare earth halide, the elemental boron and the aluminum.

It is preferable to dry the rare earth chloride prior to this operation. The mixing is carried out dry.

The powder mixture obtained is then heat treated. If the rare earth halide used is a chloride, the reaction is carried out at a temperature of from 1,000° to 1,300° C., preferably from 1,050° C. to 1,150° C. In the case of a rare earth fluoride, the reaction temperature ranges from 1,000° to 1,400° C. preferably from 1,200° to 1,300° C.

The reaction is carried out at atmospheric pressure, but under an atmosphere of a reducing and/or inert gas. Thus, hydrogen or argon may be used, whether individually or in admixture.

The atmosphere of the abovementioned gases is maintained throughout the reaction.

The duration of the reaction is a function of the capacity of the apparatus and its ability to rapidly increase the temperature. Generally, once the desired temperature is attained, it is maintained for 1 to 4 hours and preferably from 1 to 2 hours.

During the reaction a rare earth boride is formed and most of the aluminum is released in the gaseous state, possibly together with a minor amount of a boron halide, even a boron oxyhalide. The gases formed may be captured, for example by bubbling same through water.

The reaction mass is then cooled to ambient temperature (15° to 25° C.). Cooling is carried out under a reducing and/or an inert atmosphere until the reaction temperature is less than 300° C.

The rare earth boride is directly recovered.

It may be desirable to carry out one or more, preferably three, washes with water of the halides that may be present as impurities. For this, the product is suspended in water, followed by separation by conventional solid/liquid techniques, in particular filtering, decantation, draining, etc.

According to the process of the invention, a rare earth boride is produced More particularly, a rare earth hexaboride or a rare earth tetraboride is produced, depending on the stoichiometric amounts of the starting materials. The rare earth hexaboride has a cubic elementary lattice of the CsCl type, while the rare earth tetraboride crystallizes in the quadratic system.

The process of the invention may be carried out in any conventional apparatus.

The mixture of the rare earth halide, the aluminum and the boron may be carried out in a powder mixer of known type: drum type free-fall mixer, vertical or horizontal helical screw mixers, horizontal Lodige mixer, etc., or any conventional type of grinders, such as a ball grinder.

The mixture obtained is placed into a boat or crucible, e.g., made of alumina, zirconia, vitreous carbon or preferably graphite, whereupon the entire assembly is introduced into a chamber, tunnel, muffle or rotating furnace having a conventional refractory lining (alumina or aluminasilicate). The furnace is equipped with a device to regulate the temperature during the heat treatment. It must be airtight and enable the circulation of gases therein (hydrogen, inert gases). An apparatus to recover the released gases, for example a wash tower, must be provided.

In order to further illustrate the present invention and the advantages thereof, the following specific examples are given, it being understood that same are intended only as illustrative and in nowise limitative.

EXAMPLE 1

Preparation of cerium hexaboride

A cerium chloride, $CeCl_3 \cdot 7H_2O$ (99.5% pure), was first dried for 24 hours at a temperature of 100° C. and under a reduced pressure of 1,000 Pa.

31.9 g of said product were mixed with 6.48 g crystalline boron marketed by the Prolabo Co. (having a purity of 98% and a particle size distribution ranging from 25 to 63 μm) and 2.5 g aluminum (99% pure), also marketed by the Prolabo Co., which represented a slight deficiency of the aluminum relative to the stoichiometric amount.

This mixture was introduced into a graphite crucible, which in turn was placed a tubular furnace with an alumina refractory lining, in which a flowstream of argon containing 10% hydrogen was established.

The temperature was increased to 1,300° C. and maintained thereat for 2 hours.

The reaction mass was then cooled in the furnace at the thermal inertia of the furnace and the flow of gas was maintained until the temperature was less than 300° C.

22 g of a bluish-violet product were obtained.

The resulting product was washed by suspending same in water to eliminate any trace amounts of chloride.

The final product was cerium hexaboride having an X-ray diffraction pattern conforming to ASTM plate 11670.

A powder was obtained having a mean particle diameter of 19 μm, following ultrasonic comminution of the aggregates for 2 min.

EXAMPLE 2

Preparation of yttrium tetraboride

Yttrium chloride, $YCl_3 \cdot 7H_2O$ (99.5% pure) was first dried for 24 hours at a temperature of 100° C. and under a reduced pressure of 1,000 Pa.

21.8 g of said product were mixed with 5.55 g of crystalline boron marketed by the Prolabo Co. (having a purity of 98% and a particle size distribution ranging from 25 to 63 μm) and 2.5 g aluminum (99% pure), also marketed by the Prolabo Co., which represented a slight deficiency in aluminum relative to the stoichiometric amount.

This mixture was then introduced into a graphite crucible, which was in turn placed in a tubular furnace with a refractory alumina lining, in which a flowstream of argon containing 10% hydrogen was established.

The temperature was increased to 1,050° C. and maintained thereat for 2 hours.

The reaction mass was then cooled at the thermal inertia of the furnace, with the flow of gas maintained, until the temperature was less than 300° C.

13.5 g of yttrium tetraboride were obtained.

The resulting product was washed by suspending same in water to eliminate any trace amounts of chloride.

The final product had an X-ray diffraction pattern conforming to the ASTM plate 7-57.

EXAMPLE 3

Preparation of cerium hexaboride 1.97 g cerium fluoride $CeF_3$ were mixed with 0.66 g crystalline boron marketed by the Prolabo Co (having a purity of 98% and a particle size distribution ranging from 25 to 63 μm) and 0.27 g aluminum (99% pure), also marketed by the Prolabo Co., which represented a slight deficiency in aluminum relative to the stoichiometric amount.

This mixture was introduced into a graphite crucible which was in turn placed in a tubular furnace with a refractory alumina lining, in which a flowstream of argon was established.

The temperature was increased to 1,300° C. and maintained thereat for 2 hours.

The reaction mass was then cooled at the rate of thermal inertia of the furnace, with the flow of gas maintained until the temperature was less than 300° C.

2.0 g cerium hexaboride were obtained.

The final product was cerium hexaboride having an X-ray diffraction pattern conforming to ASTM plate 11670.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a rare earth boride selected from the group consisting of a rare earth tetraboride and a rare earth hexaboride, comprising a step of reacting a rare earth halide with elemental boron and forming a final product rare earth boride, the rare earth halide and the elemental boron being reacted during the reacting step in the presence of a reducing amount of aluminum effective to bind halide values furnished by the rare earth halide.

2. The process as defined by claim 1, said rare earth halide comprising a lanthanide or yttrium chloride or fluoride.

3. The process as defined by claim 1, for the preparation of a rare earth hexaboride.

4. The process as defined by claim 1, for the preparation of a rare earth tetraboride.

5. The process as defined by claim 2, for the preparation of cerium hexaboride or yttrium tetraboride.

6. The process as defined by claim 1, said rare earth halide comprising a rare earth chloride.

7. The process as defined by claim 1, said rare earth halide comprising a rare earth fluoride.

8. The process as defined by claim 1, said rare earth halide comprising a mixture of a chloride and/or fluoride of at least two rare earths.

9. The process as defined by claim 6, said rare earth chloride having been dried at a temperature of from 20° to 200° C. in air or under a reduced pressure.

10. The process as defined by claim 3, wherein the amount of elemental boron, expressed relative to the amount of the rare earth halide, is at the most equal to the stoichiometric amount.

11. The process as defined by claim 10, wherein the amount of elemental boron comprises a 10% to 20% stoichiometric deficiency.

12. The process as defined by claim 1, wherein the molar ratio of the elemental boron to the rare earth halide ranges from 5.2 to 6.5.

13. The process as defined by claim 1, wherein the molar ratio of the elemental boron to the rare earth halide ranges from 3.6 to 4.5.

14. The process as defined by claim 3, wherein the amount of aluminum, expressed relative to the amount of the rare earth halide, is at the most equal to the stoichiometric amount.

15. The process as defined by claim 14, wherein the aluminum is present in a 10% to 20% stoichiometric deficiency.

16. The process as defined by claim 1, carried out at a temperature of from 1,000° to 1,300° C.

17. The process as defined by claim 10, carried out at a temperature of from 1,050° to 1,150° C.

18. The process as defined by claim 1, carried out at a temperature of from 1,000° to 1,400° C.

19. The process as defined by claim 18, carried out at a temperature of from 1,200° to 1,300° C.

20. The process as defined by claim 1, carried out under a hydrogen and/or inert gas atmosphere.

21. The process as defined by claim 20, carried out under a hydrogen and/or argon atmosphere.

22. The process as defined by claim 1, carried out for from 1 to 4 hours.

23. The process as defined by claim 22, carried out for from 1 to 2 hours.

24. The process as defined by claim 1, further comprising cooling the reaction mass to a temperature of no greater than 300° C. under a reducing and/or inert atmosphere.

25. The process as defined by claim 1, further comprising recovering said rare earth boride after cooling same to ambient temperature.

26. The process as defined by claim 1, further comprising washing the final product rare earth boride one or more times with water.

27. The process as defined by claim 4, wherein the amount of elemental boron, expressed relative to the amount of the rare earth halide, is at the most equal to the stoichiometric amount.

28. The process as defined by claim 27, wherein the amount of elemental boron comprises a 10% to 20% stoichiometric deficiency.

29. The process as defined by claim 4, wherein the amount of aluminum, expressed relative to the amount of the rare earth halide, is at the most equal to the stoichiometric amount.

30. The process as defined by claim 29, wherein the aluminum is present in a 10% to 20% stoichiometric deficiency.

* * * * *